(12) United States Patent
Komatsu et al.

(10) Patent No.: US 11,499,063 B2
(45) Date of Patent: Nov. 15, 2022

(54) INK JET TEXTILE PRINTING INK COMPOSITION AND RECORDING METHOD

(71) Applicant: Seiko Epson Corporation, Tokyo (JP)

(72) Inventors: Hidehiko Komatsu, Chino (JP); Yuki Wakushima, Matsumoto (JP); Hiroaki Maruyama, Shiojiri (JP)

(73) Assignee: SEIKO EPSON CORPORATION

( * ) Notice: Subject to any disclaimer, the term of this patent is extended or adjusted under 35 U.S.C. 154(b) by 422 days.

(21) Appl. No.: 16/776,648

(22) Filed: Jan. 30, 2020

(65) Prior Publication Data

US 2020/0248020 A1 Aug. 6, 2020

(30) Foreign Application Priority Data

Jan. 31, 2019 (JP) .............................. JP2019-015667

(51) Int. Cl.
*B41J 2/01* (2006.01)
*C09D 11/328* (2014.01)
*C09D 11/38* (2014.01)

(52) U.S. Cl.
CPC ............... *C09D 11/328* (2013.01); *B41J 2/01* (2013.01); *C09D 11/38* (2013.01)

(58) Field of Classification Search
CPC .......... B41J 2/01; B41M 5/0047; B41M 7/00; C09B 31/02; C09D 11/00; C09D 11/16;
(Continued)

(56) References Cited

U.S. PATENT DOCUMENTS 4,997,917 A 3/1991 Iff et al.
2007/0076073 A1\* 4/2007 Hornby ................ C09D 11/328
347/100
(Continued)

FOREIGN PATENT DOCUMENTS

CN 102634230 A 8/2012
CN 108250842 A 7/2018
(Continued)

*Primary Examiner* — Anh T Vo
(74) *Attorney, Agent, or Firm* — Harness, Dickey & Pierce, P.L.C.

(57) ABSTRACT

An ink jet textile printing ink composition contains a sulfonic acid group-containing dye having a ligand coordinated to a metal atom, the ligand being represented by Formula (1) below:

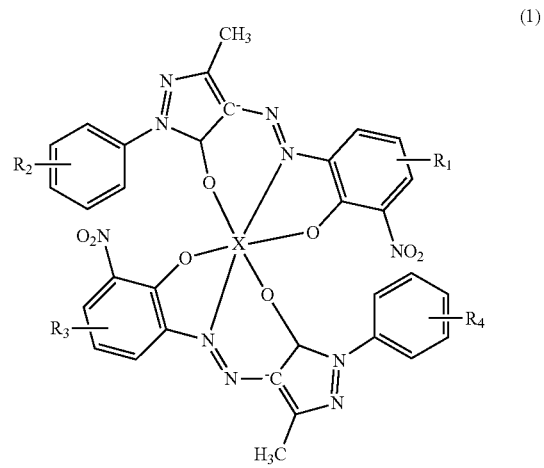

wherein at least one of $R_1$ and $R_3$ represents $SO_3^-$ or $SO_3Y$, where Y represents a hydrogen atom, an alkali metal atom, or an alkaline earth metal atom; when not representing $SO_3^-$ or $SO_3Y$, $R_1$ and $R_3$ represent a halogen atom or a hydrogen atom; $R_2$ and $R_4$ each independently represent a hydrogen atom, a halogen atom, a sulfo group, a nitro group, an aryl group, a sulfonamide group, a carboxy group, an alkyl group
(Continued)

of 1 to 4 carbon atoms, $SO_2NHR_5$, or $COOR_5$, where $R_5$ represents a hydrogen atom or an alkyl group; and X represents a metal atom.

13 Claims, 1 Drawing Sheet

(58) Field of Classification Search
CPC ....... C09D 11/17; C09D 11/30; C09D 11/328; C09D 11/38
See application file for complete search history.

(56) References Cited

U.S. PATENT DOCUMENTS

| | | |
|---|---|---|
| 2008/0189883 A1 | 8/2008 | Ruchser et al. |
| 2008/0280052 A1 | 11/2008 | Lacroix |
| 2018/0179407 A1 | 6/2018 | Miyajima et al. |

FOREIGN PATENT DOCUMENTS

| | | |
|---|---|---|
| GB | 1197265 A | 7/1970 |
| JP | S57-171779 A | 10/1982 |
| JP | S58-176267 A | 10/1983 |
| JP | S60-208363 A | 10/1985 |
| JP | 2007-515561 A | 6/2007 |
| JP | 2008-533266 A | 8/2008 |
| JP | 2008-266537 A | 11/2008 |

* cited by examiner

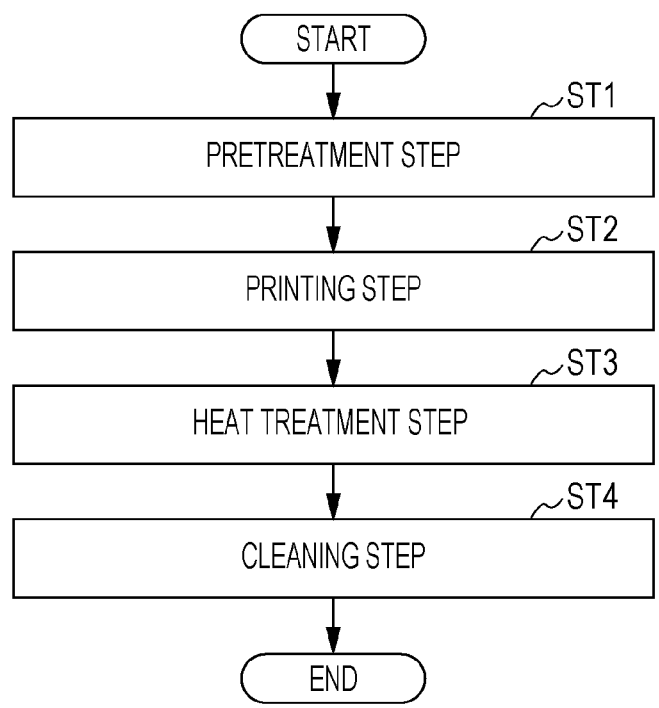

INK JET TEXTILE PRINTING INK COMPOSITION AND RECORDING METHOD

The present application is based on, and claims priority from JP Application Serial Number 2019-015667, filed Jan. 31, 2019, the disclosure of which is hereby incorporated by reference herein in its entirety.

BACKGROUND

1. Technical Field

The present disclosure relates to an ink jet textile printing ink composition and a recording method.

2. Related Art

Ink jet recording methods enable high-definition image recording with a relatively simple device, and have seen a rapid development in many fields. In this context, various lines of research have been conducted on obtaining recorded articles having higher stability and higher quality.

For example, JP-A-2008-266537 discloses an ink jet ink for performing textile printing on polyamide fibers that has good color reproducibility, high fastness, and storage stability. This ink jet ink is characterized by containing 6 to 12% by mass of C.I. No. Acid Red 447 serving as a dye, water, and at least one glycol ether and at least two polyhydric alcohols serving as solvents.

The ink jet ink disclosed in JP-A-2008-266537 has good color reproducibility on polyamide fibers through textile printing and high fastness mainly because of containing a predetermined amount of C.I. No. Acid Red 447 as a dye. However, the ink jet ink disclosed in JP-A-2008-266537 still has room for improvement in the fastness, particularly light fastness, of textile prints obtained through ink jet textile printing.

As a result of intensive research, the inventors have found that by using an ink jet textile printing ink composition containing a sulfonic acid group-containing dye having a particular ligand coordinated to a metal atom, textile prints obtained through ink jet textile printing can have good light fastness, and thus have completed the present disclosure.

SUMMARY

The present disclosure is an ink jet textile printing ink composition containing a sulfonic acid group-containing dye having a ligand coordinated to a metal atom, the ligand being represented by Formula (1) below:

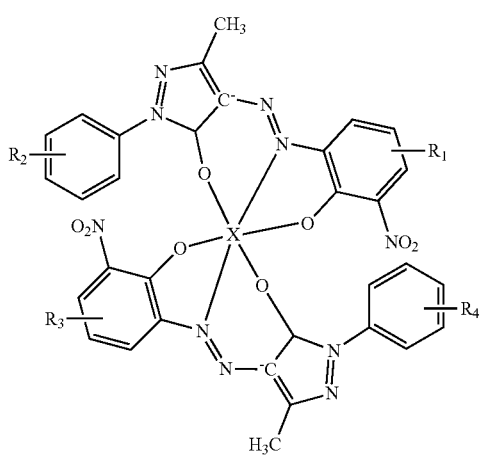

(1)

wherein at least one of $R_2$ and $R_3$ represents $SO_3^-$ or $SO_3Y$, where Y represents a hydrogen atom, an alkali metal atom, or an alkaline earth metal atom; when not representing $SO_3^-$ or $SO_3Y$, $R_1$ and $R_3$ represent a halogen atom or a hydrogen atom; $R_2$ and $R_4$ each independently represent a hydrogen atom, a halogen atom, a sulfo group, a nitro group, an aryl group, a sulfonamide group, a carboxy group, an alkyl group of 1 to 4 carbon atoms, $SO_2NHR_5$, or $COOR_5$, where $R_5$ represents a hydrogen atom or an alkyl group; and X represents a metal atom.

Furthermore, in the ink jet textile printing ink composition according to the present disclosure, the metal atom may be a chromium atom. Moreover, the ink jet textile printing ink composition according to the present disclosure may further contain a first dye having a ligand represented by Formula (1) where one of $R_1$ and $R_3$ represents $SO_3^-$ or $SO_3Y$, and the other represents a halogen atom or a hydrogen atom, the ligand being coordinated to a metal atom and a second dye having a ligand represented by Formula (1) where both $R_1$ and $R_3$ represent $SO_3^-$ or $SO_3Y$, the ligand being coordinated to a metal atom. In addition, a mass ratio of a content of the second dye to a content of the first dye may be 1/100 to 1/1, and a content of the second dye may be 0.1% by mass or more and 50% by mass or less with respect to a total amount of the ink jet textile printing ink composition.

Furthermore, the ink jet textile printing ink composition according to the present disclosure may further contain a third dye having a ligand coordinated to a metal atom, the ligand being represented by Formula (2) below:

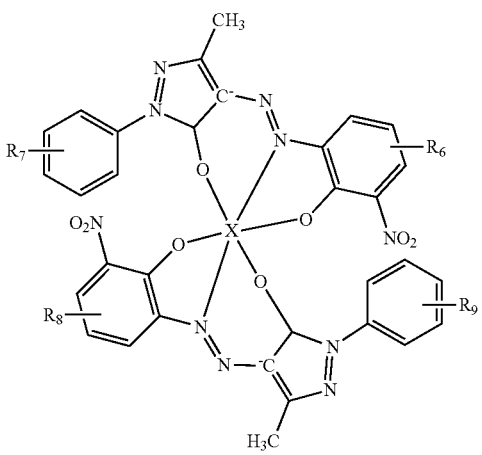

(2)

wherein $R_6$ and $R_8$ each independently represent a halogen atom or a hydrogen atom; $R_7$ and $R_9$ each independently represent a hydrogen atom, a halogen atom, a sulfo group, a nitro group, an aryl group, a sulfonamide group, a carboxy group, an alkyl group of 1 to 4 carbon atoms, $SO_2NHR_5$, or $COOR_5$, where $R_5$ represents a hydrogen atom or an alkyl group; and X represents a metal atom.

Moreover, a mass ratio of a content of the third dye to a content of the sulfonic acid group-containing dye may be 1/99 to 1/1, and a content of the third dye may be 0.1% by mass or more and 20% by mass or less with respect to a total amount of the ink jet textile printing ink composition.

Furthermore, in the ink jet textile printing ink composition according to the present disclosure, a content of the sulfonic acid group-containing dye may be 0.01% by mass or more and 50% by mass or less with respect to a total amount of the ink jet textile printing ink composition, and the ink jet textile printing ink composition according to the present disclosure may further contain a compound having a lactam structure. The compound having a lactam structure may be 2-pyrrolidone, 2-azetidinone, 2-piperidone, ε-caprolactam, 4-ethyl-2-azetidinone, N-methyl-2-pyrrolidone, or 3-amino-2-piperidone. In addition, a content of the compound having a lactam structure may be 1.0% by mass or more and 20% by mass or less with respect to a total amount of the ink jet textile printing ink composition.

A recording method according to the present disclosure is a recording method including ejecting the ink jet textile printing ink composition by using an ink jet system and causing the ink jet textile printing ink composition to adhere to a recording medium, wherein the recording medium is a fabric.

BRIEF DESCRIPTION OF THE DRAWINGS

FIGURE is a flowchart illustrating an example of a recording method according to the present embodiment.

DESCRIPTION OF EXEMPLARY EMBODIMENTS

While an embodiment of the present disclosure (hereafter referred to as the "present embodiment") will be described in detail with reference to the drawing as needed, the present disclosure is not limited to the embodiment, and various modifications are possible without departing from the spirit of the disclosure.

In the present specification, the term "textile printing" refers to recording an ink on a recording medium, such as a fabric (hereafter also referred to as "printing"). Furthermore, the term "ink jet textile printing" refers to recording an ink on a recording medium, such as a fabric, by using an ink jet system, which is one kind of ink jet recording. The term "recorded article" refers to a recording medium, such as a fabric, on which an ink is recorded to form an image.

Ink Composition

An ink jet textile printing ink composition according to the present embodiment (hereafter also simply referred to as an "ink composition") contains a sulfonic acid group-containing dye (hereafter also referred to as a "dye according to the present embodiment") having a ligand coordinated to a metal atom, the ligand being represented by Formula (1) below.

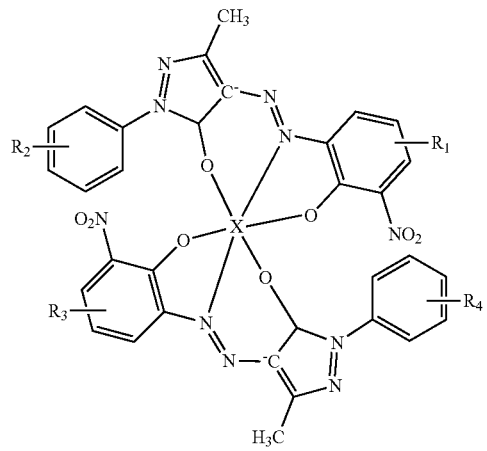

In Formula (1), at least one of $R_1$ and $R_3$ represents $SO_3^-$ or $SO_3Y$, where Y represents a hydrogen atom, an alkali metal atom, or an alkaline earth metal atom; when not representing $SO_3^-$ or $SO_3Y$, $R_1$ and $R_3$ each represent a halogen atom or a hydrogen atom; $R_2$ and $R_4$ each independently represent a hydrogen atom, a halogen atom, a sulfo group, a nitro group, an aryl group, a sulfonamide group, a carboxy group, an alkyl group of 1 to 4 carbon atoms, $SO_2NHR_5$, or $COOR_5$, where $R_5$ represents a hydrogen atom or an alkyl group; and X represents a metal atom.

The metal atom may be any metal atom as long as a ligand represented by Formula (1) can be coordinated thereto. Examples of the metal atom include, but are not limited to, atoms of chromium (Cr), iron (Fe), cobalt (Co), and copper (Cu), and in view of further improving light fastness, a chromium (Cr) atom is preferable. Examples of the alkyl group of 1 to 4 carbon atoms include a methyl group, an ethyl group, a propyl group, and a butyl group.

Non-limiting examples of the halogen atom include atoms of chlorine (Cl), fluorine (F), bromine (Br), and iodine (I), and in view of further improving light fastness, a chlorine (Cl) atom is preferable.

Non-limiting examples of the alkali metal atom and the alkaline earth metal include atoms of lithium (Li), sodium (Na), potassium (K), beryllium (Be), magnesium (Mg), calcium (Ca), and barium (Ba), and in view of further improving light fastness, a sodium (Na) atom is preferable.

The ratio of a metal atom to a ligand represented by Formula (1) coordinated to the metal atom denoted by (metal atom):(ligand represented by Formula (1) coordinated to metal atom) is preferably 1:2 to 2:3 by mole, and more preferably 1:1 by mole, in view of achieving better coloring properties. In this range, a ligand can coordinate to a metal atom and form a complex easily. As a result, better coloring properties tend to be achieved.

Factors contributing to the good light fastness of the ink composition according to the present embodiment probably include, but not limited to, the following. When a dye having a sulfonic acid group-containing ligand coordinated to a metal atom is used in an existing ink composition, good recovery from clogging and good storage stability can be achieved because of an added polarity of the dye contained in the ink composition. However, when the content of the dye is increased to the extent that good storage stability is achieved, the fastness, particularly light fastness and water fastness, of textile prints obtained through ink jet textile printing deteriorates. On the other hand, the ink composition according to the present embodiment contains a sulfonic acid group-containing dye having a particular sulfonic acid group-containing ligand coordinated to a metal atom. Thus, even when the content of the dye is increased to the extent that good recovery from clogging and good storage stability are achieved, good fastness, particularly good light fastness and good water fastness, of the textile prints obtained through ink jet textile printing is achieved. In other words, the ink composition according to the present embodiment enables textile prints obtained through ink jet textile printing to have good light fastness. Furthermore, the ink composition according to the present embodiment enables textile prints obtained through ink jet textile printing to combine good recovery from clogging and good storage stability with good light fastness and good water fastness.

Dye

The ink composition according to the present embodiment achieves good light fastness because of containing the dye according to the present embodiment.

The specifics of the dye according to the present embodiment are not particularly limited, but the ink composition according to the present embodiment preferably contains a first dye having a ligand represented by Formula (1) where one of $R_1$ and $R_3$ represents $SO_3^-$ or $SO_3Y$, and the other represents a halogen atom or a hydrogen atom, the ligand being coordinated to a metal atom, and a second dye having a ligand represented by Formula (1) where both $R_1$ and $R_3$ represent $SO_3^-$ or $SO_3Y$, the ligand being coordinated to a metal atom, in view of achieving the effects of the present disclosure with greater certainty.

When the ink composition contains the first dye and the second dye, the mass ratio of the content of the second dye to the content of the first dye is preferably 1/100 to 1/1, more preferably 1/75 to 1/1.5, and even more preferably 1/50 to 1/2, in view of combining good recovery from clogging and good storage stability with good light fastness and good water fastness.

When ink composition contains the first dye, the content of the first dye is preferably 0.01% by mass or more and 50% by mass or less, more preferably 0.1% by mass or more and 30% by mass or less, and even more preferably 1.0% by mass or more and 15% by mass or less with respect to the total amount of the ink composition. When the content of the dye according to the present embodiment is 1.0% by mass or more, light fastness and water fastness tend to further improve. Furthermore, when the content of the dye according to the present embodiment is 50% by mass or less, recovery from clogging and storage stability tend to further improve. The expression "the total amount of the ink composition" as used herein refers to 100% by mass, and the same applies to the following.

When the ink composition contains the second dye, the content of the second dye is preferably 0.1% by mass or more and 50% by mass or less, more preferably 0.15% by mass or more and 10% by mass or less, and even more preferably 0.2% by mass or more and 5.0% by mass or less with respect to the total amount of the ink composition. When the content of the dye according to the present embodiment is 0.1% by mass or more, recovery from clogging and storage stability tend to further improve. Furthermore, when the content of the dye according to the present embodiment is 15% by mass or less, light fastness and water fastness tend to further improve.

The content of the dye according to the present embodiment is preferably 0.01% by mass or more and 50% by mass or less, more preferably 0.1% by mass or more and 30% by mass or less, and even more preferably 1.0% by mass or more and 15% by mass or less with respect to the total amount of the ink composition. When the content of the dye according to the present embodiment is 1.0% by mass or more, light fastness and water fastness tend to further improve. Furthermore, when the content of the dye according to the present embodiment is 50% by mass or less, recovery from clogging and storage stability tend to further improve.

The ink composition according to the present embodiment may contain dyes other than the dye according to the present embodiment (hereafter referred to as "other dyes"). Furthermore, dyes may be used alone or in combination.

The ink composition according to the present embodiment preferably contains, as other dyes, a third dye having a ligand that does not contain a sulfonic acid group and that is coordinated to a metal atom, the ligand being represented by Formula (2) below. When the ink composition contains the third dye, better light fastness and water fastness tend to be achieved.

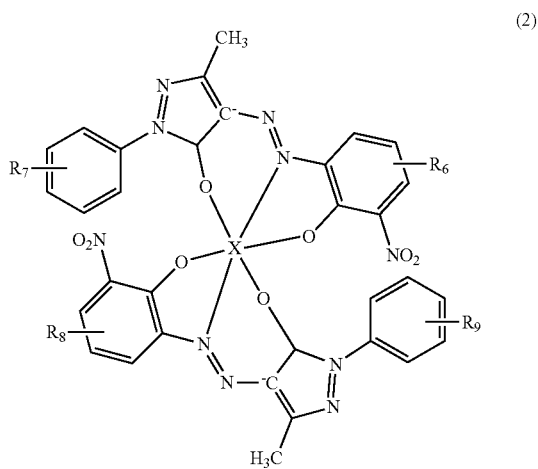

(2)

In Formula (2), $R_6$ and $R_8$ each independently represent a halogen atom or a hydrogen atom; $R_7$ and $R_9$ each independently represent a hydrogen atom, a halogen atom, a sulfo group, a nitro group, an aryl group, a sulfonamide group, a carboxy group, an alkyl group of 1 to 4 carbon atoms, $SO_2NHR_5$, or $COOR_5$, where $R_5$ represents a hydrogen atom or an alkyl group; and X represents a metal atom.

When the ink composition contains the third dye, the mass ratio of the content of the third dye to the content of the dye according to the present embodiment is preferably 1/100 to 2/1, more preferably 1/50 to 1/1, and even more preferably 1/25 to 1/2, in view of combining good recovery from clogging and storage stability with good light fastness and good water fastness.

When the ink composition contains the third dye, the content of the third dye is preferably 0.1% by mass or more and 20% by mass or less, more preferably 0.15% by mass or more and 10% by mass or less, and even more preferably 0.2% by mass or more and 5.0% by mass or less with respect to the total amount of the ink composition. When the content of the dye according to the present embodiment is 0.1% by mass or more, light fastness and water fastness tend to further improve. Furthermore, when the content of the dye according to the present embodiment is 15% by mass or less, recovery from clogging and storage stability tend to further improve.

The ink composition according to the present embodiment can be used for an yellow ink, a magenta ink, a cyan ink, a red ink, a blue ink, a black ink, or an orange ink and preferably for a black ink by adjusting the types and contents of dyes, such as the dye according to the present embodiment, and other components.

Water

The ink composition according to the present embodiment may contain water. Examples of the water include water with ionic impurities removed to the extent possible such as pure water, which includes ion-exchanged water, ultrafiltration water, reverse osmosis water, and distilled water, and ultrapure water. Furthermore, the use of water sterilized by, for example, ultraviolet (UV) irradiation or hydrogen peroxide addition can keep mold and bacteria from growing when long-term storage of an aggregate is performed. As a result, storage stability tends to further improve.

The content of the water is preferably 40% by mass or more, more preferably 50% by mass or more, and particularly preferably 60% by mass or more with respect to the total amount of the ink composition.

Compound Having Lactam Structure

The ink composition according to the present embodiment preferably contains a compound having a lactam structure. Any compound that has a lactam structure can be used as the compound having a lactam structure. When the ink composition contains a compound having a lactam structure, the solubility of a dye in the ink composition can be improved, and as a result, good recovery from clogging is achieved.

Non-limiting examples of the compound having a lactam structure include 2-pyrrolidone, 2-azetidinone, 2-piperidone, ε-caprolactam, 4-ethyl-2-azetidinone, N-methyl-2-pyrrolidone, and 3-amino-2-piperidone. The compound having a lactam structure is preferably one or more selected from 2-pyrrolidone, 2-azetidinone, 2-piperidone, ε-caprolactam, 4-ethyl-2-azetidinone, N-methyl-2-pyrrolidone, and 3-amino-2-piperidone.

Compounds having a lactam structure may be used alone or in combination.

The content of the compound having a lactam structure is preferably 30% by mass or less, more preferably 22% by mass or less, and even more preferably 15% by mass or less with respect to the total amount of the ink composition. Furthermore, the content of the compound having a lactam structure is preferably 5.0% by mass or more, and more preferably 7.0% by mass or more with respect to the total amount of the ink composition. When the content of the compound having a lactam structure is 30% by mass or less, storage stability tends to further improve. Furthermore, when the content of the compound having a lactam structure is 5.0% by mass or more, recovery from clogging tends to further improve.

Polyol Derivatives

The ink composition according to the present embodiment preferably contains polyol derivatives. The polyol derivatives may be any polyol derivatives that are compounds having more than one hydroxy group or that are compounds synthesized from such compounds. The compounds having more than one hydroxy group are alkyl polyols which are described below. The compounds synthesized from the compounds having more than one hydroxy group are condensates of and etherified products of such compounds, such as glycol ethers which are described below. When the ink composition contains polyol derivatives, good storage stability and good recovery from clogging are achieved.

Non-limiting examples of polyol derivatives include alkyl polyols and glycol ethers.

Non-limiting examples of alkyl polyols include glycerol, ethylene glycol, diethylene glycol, triethylene glycol, propylene glycol (1,2-propanediol), dipropylene glycol, 1,3-propylene glycol (1,3-propanediol), isobutylene glycol (2-methyl-1,2-propanediol), 1,2-butanediol, 1,3-butanediol, 1,4-butanediol, 2-butene-1,4-diol, 1,2-pentanediol, 1,5-pentanediol, 3-methyl-1,5-pentanediol, 2-methyl-2,4-pentanediol, 1,2-hexanediol, 1,6-hexanediol, 2-ethyl-1,3-hexanediol, 1,7-heptanediol, and 1,8-octanediol.

Non-limiting examples of glycol ethers include glycol diethers and glycol monoethers.

Non-limiting specific examples of glycol diethers include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

Non-limiting specific examples of glycol monoethers include ethylene glycol monomethyl ether, ethylene glycol monoethyl ether, ethylene glycol mono-n-propyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Polyol derivatives may be used alone or in combination.

The content of the polyol derivatives is preferably 0.1% by mass or more and 50% by mass or less, more preferably 1.0% by mass or more and 40% by mass or less, and even more preferably 10% by mass or more and 25% by mass or less with respect to the total amount of the ink composition. When the content of the polyol derivatives is 25% by mass or less, storage stability tends to further improve. Furthermore, when the content of the polyol derivatives is 0.1% by mass or more, recovery from clogging tends to further improve.

Surfactant

The ink composition preferably contains a surfactant in view of wettability. Non-limiting examples of the surfactant include acetylene glycol surfactants, fluorosurfactants, and silicone surfactants.

The acetylene glycol surfactants may be any acetylene glycol surfactants, but are preferably one or more selected from 2,4,7,9-tetramethyl-5-decyne-4,7-diol, alkylene oxide adducts of 2,4,7,9-tetramethyl-5-decyne-4,7-diol, 2,4-dimethyl-5-decyn-4-ol, and alkylene oxide adducts of 2,4-dimethyl-5-decyn-4-ol. Non-limiting examples of commercially available acetylene glycol surfactants include OLFINE PD-002W, OLFINE 104 series, and OLFINE E series such as OLFINE E1010 (product names, manufactured by Nissin Chemical Industry Co., Ltd.); and SURFYNOL 104, SURFYNOL 465, SURFYNOL 61, and SURFYNOL DF110D (product names, manufactured by Air Products Japan, Inc.). Acetylene glycol surfactants may be used alone or in combination.

Non-limiting examples of the fluorosurfactant include perfluoroalkylsulfonic acid salts, perfluoroalkylcarboxylic acid salts, perfluoroalkyl phosphates, perfluoroalkyl ethylene oxide adducts, perfluoroalkylbetaines, and perfluoroalkylamine oxide compounds. Non-limiting examples of commercially available fluorosurfactants include S-144 and S-145 (product names, manufactured by Asahi Glass Co., Ltd.); FLUORAD FC-170C, FLUORAD FC-430C, and FLUORAD FC-4430 (product names, manufactured by Sumitomo 3M Ltd.); FSO, FSO-100, FSN, FSN-100, and FS-300 (product names, manufactured by DuPont de Nemours, Inc.); and FT-250 and FT-251 (product names, manufactured by NEOS Co., Ltd.). Fluorosurfactants may be used alone or in combination.

Non-limiting examples of the silicone surfactant include polysiloxane compounds and polyether-modified organosiloxanes. Non-limiting specific examples of commercially available silicone surfactants include BYK-306, BYK-307, BYK-333, BYK-341, BYK-345, BYK-346, BYK-347, BYK-348, and BYK-349 (product names, manufactured by BYK Japan Co., Ltd.); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (product names, manufactured by Shin-Etsu Chemical Co., Ltd.). Silicone surfactants may be used alone or in combination.

The content of the surfactant is preferably 0.05% by mass or more and 2.5% by mass or less, and more preferably 0.1% by mass or more and 1.5% by mass or less with respect to the total amount of the ink composition. When the content of the surfactant is set in this range, the wettability of the ink composition adhering to a recording medium tends to further improve.

As other components, the ink composition may contain various additives such as a pH adjuster (e.g., triethanol amine or tripropanol amine), a wax, a solubilizer, a viscosity modifier, an antioxidant, an antimold-antiseptic agent (e.g., PROXEL XL2 or PROXEL GXL, product names, manufactured by Lonza Japan Ltd.), an antimold agent, a corrosion inhibitor, and a chelating agent for capturing metal ions affecting dispersion (e.g., sodium ethylenediaminetetraacetate) as appropriate.

The ink composition according to the present embodiment is preferably used in the below-described method for textile printing.

The recording method according to the present embodiment involves recording by causing the ink composition to adhere to a fabric. Hereafter, each step of the recording method according to the present embodiment will be described (FIGURE).

Pretreatment Step (ST1)

The recording method according to the present embodiment may include a pretreatment step of applying, to a fabric, a pretreatment liquid containing at least one of an alkali agent and a hydrotropic agent. As a result, the dyeing properties of a dye further improve.

Examples of methods for applying a pretreatment liquid to a fabric include immersing a fabric in the pretreatment liquid, coating a fabric with the pretreatment liquid by using, for example, a roll coater, and ejecting the pretreatment liquid onto a fabric (e.g., an ink jet method or a spraying method), and any of these methods can be used.

The pretreatment liquid may contain at least one of an alkali agent and a hydrotropic agent. The contents of these components in the pretreatment liquid are non-limiting and may be set as appropriate depending on, for example, the type of fabric.

When a dye is used, alkali agents are preferably used in view of further improving the dyeing properties of the dye. Specific examples of alkali agents include sodium carbonate, sodium hydrogen carbonate, sodium hydroxide, trisodium phosphate, and sodium acetate.

A hydrotropic agent is preferably used in view of improving the coloring properties of images to be recorded. Examples of hydrotropic agents include urea.

The pretreatment liquid may contain a sizing agent. Examples of the sizing agent include starches such as corn and wheat; celluloses such as carboxymethyl cellulose and hydroxymethyl cellulose; polysaccharides such as sodium alginate, gum arabic, locust bean gum, trant gum, guar gum, and tamarind seeds; proteins such as gelatin and casein; water-soluble natural polymers such as tannins and lignins; and water-soluble synthetic polymers such as polyvinyl alcohol compounds, polyethylene oxide compounds, acrylic acid compounds, and maleic anhydride compounds.

The pretreatment liquid may contain components typically used in a pretreatment liquid for textile printing such as water, a sizing agent, an antireduction agent, an antiseptic agent, an antimold agent, a chelating agent, a pH adjuster, and a surfactant.

The recording method according to the present embodiment may include, after the pretreatment step, a pretreatment liquid-drying step of drying the pretreatment liquid applied to the fabric. While the drying of the pretreatment liquid may be performed by air-drying, drying involving heating is preferable in view of improving the drying rate. When heating is involved in the pretreatment liquid-drying step, non-limiting examples of heating processes include a heat press process, a normal-pressure steaming process, a high-pressure steaming process, and a thermal fixing process. Non-limiting examples of heat sources include infrared rays (lamps).

Non-limiting examples of materials for a fabric used in the recording method according to the present embodiment include natural fibers such as cotton, hemp, wool, and silk; synthetic fibers such as polypropylenes, polyesters, acetates, triacetates, polyamides, and polyurethanes; and biodegradable fibers such as polylactic acids. The materials may also be blended fibers of these fibers. The fabric may be any form of fabric, such as a woven fabric, a knitted fabric, or a non-woven fabric, that is formed from the above-described fibers. Particularly when using a dye in the above-described ink composition for ink jet textile printing, a fabric which contains a fiber containing cellulose as a main component (e.g., cotton, hemp, or rayon) is preferably used in view of dyeing properties.

The recording method according to the present embodiment may be performed by using a fabric pretreated in advance by using at least one of an alkali agent and a hydrotropic agent. In this case, there are instances where the pretreatment step may be skipped.

Printing Step (ST2)

The recording method according to the present embodiment includes a printing step of printing the ink composition for ink jet textile printing on a fabric. Specifically, the step involves causing ink droplets ejected through an ink jet recording system to adhere to a fabric and forming an image on the fabric. Non-limiting examples of the ink jet recording system include a charge deflection system, a continuous system, an on-demand system (e.g., a piezoelectric system or a Bubble Jet (registered trademark) system). Among these ink jet recording systems, a system in which a piezoelectric ink jet recording device is used is particularly preferable.

Heat Treatment Step (ST3)

The recording method according to the present embodiment may include a heat treatment step of heat treating the fabric on which the above-described ink composition has been printed. The heat treatment step enables good dyeing of fibers by a dye. Publicly known methods may be used in the heat treatment step, examples of which include a high-temperature steaming method (HT method), a high-pressure steaming method (HP method), and a thermosol method.

The heat treatment step is preferably performed at a temperature set in the range of 90° C. or more and 110° C. or less in view of improving the dyeing properties of a colorant taken up by the fabric while suppressing damage to the fabric.

Cleaning Step (ST4)

The recording method according to the present embodiment may include a cleaning step of cleaning prints. The cleaning step is preferably performed after the heat treatment step and can effectively remove the dye that has not been taken up by fibers. The cleaning step may be performed, for example, by using water and may involve a soaping treatment as needed.

EXAMPLES

Hereafter, the disclosure will be described in further detail with reference to examples. However, the present disclosure is not limited to the examples described below. Hereafter, "parts" and "%" are on a mass basis unless otherwise indicated.

Production Example 1 (Dye Used in Example 1)

Step 1

After 40 parts of 2-amino-6-nitrophenol was added to 400 parts of water, a 25% aqueous solution of sodium hydroxide was added to the mixture to yield an aqueous solution having a pH of 7.5 to 8.0. After adding 30 parts of 35% hydrochloric acid to the aqueous solution, the aqueous solution was cooled in an ice bath to 5° C. to 10° C., where 50 parts of a 40% aqueous solution of sodium nitrite was added for a reaction for about 30 minutes at the same temperature. Subsequently, 2 parts of sulfamic acid was added thereto and the resulting mixture was agitated for 5 minutes to yield a diazo reaction liquid.

Separately from the above, 54 parts of 1-(4-chlorophenyl)-3-methyl-5-pyrazolone was added to 400 parts of water. A 25% aqueous solution of sodium hydroxide was then added to the mixture to yield an aqueous solution having a pH of 8.5 to 9.0, and the aqueous solution was cooled in an ice bath to 5° C. to 10° C. The diazo reaction liquid prepared above was added dropwise to the aqueous solution over 15 minutes while the pH was maintained at 8.5 to 9.0 by adding a 25% aqueous solution of sodium hydroxide as needed and the temperature was maintained at 5° C. to 10° C. The reaction was further caused to proceed for 3 hours while the pH was maintained at 8.5 to 9.0 and the temperature was maintained at 5° C. to 10° C. Thus, a precipitated solid was filtered to yield 380 parts of an azo compound represented by Formula (3) below as a wet cake.

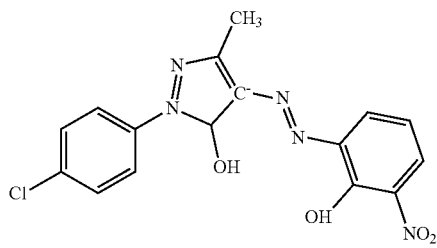

(3)

Step 2

The entire wet cake obtained in Step 1, 65 parts of chromium potassium sulfate dodecahydrate, and 21 parts of a sodium acetate were added to 700 parts of dimethylformamide for a reaction at 110° C. to 120° C. for 4 hours. The reaction product was cooled to 20° C. to 30° C. and then insolubles were filtered out to yield a filtrate.

Separately from the above, 112 parts of tetrabutylammonium bromide was added to 5000 parts of water to yield an aqueous solution. The filtrate obtained above was added dropwise to the aqueous solution over about 30 minutes, and a precipitated solid was filtered to yield 230 parts of a wet cake. The entire wet cake obtained was suspended in 1000 parts of water again, agitated for 1 hour, filtered, and dried to yield 70 parts of an azo compound represented by Formula (3). The maximum absorption wavelength of the azo compound was 499 nm (ethanol).

Step 3

While a 20% solution of fuming sulfuric acid was cooled with ice to maintain a temperature of 10° C. or less, 20 parts of the azo compound obtained in Step 2 was gradually added to the solution for a reaction at 15° C. for 8 hours. The reaction liquid was poured into 400 parts of iced water, 30 parts of sodium chloride was added thereto, and the resulting mixture was agitated for 1 hour. A precipitated solid was then filtered and washed with 25 parts of a 10% aqueous solution of sodium chloride to yield a wet cake. Next, the resulting wet cake was added to 400 parts of water and the mixture was agitated for 30 minutes, after which insolubles were filtered out. Subsequently, 40 parts of sodium chloride was added to the resulting mother liquor and the mixture was agitated for 1 hour. A precipitated solid was then filtered and dried to yield a red wet cake as a dye. The resulting dye was analyzed by high performance liquid chromatography (HPLC).

Each component in the dye was separated according to the following conditions by HPLC.

HPLC Conditions

ODS column: BEH $C_{18}$, 1.7 μm, 100 mm (manufactured by Waters Corporation),

Eluent: gradient of 1% aqueous solution of acetonitrile to 95% aqueous solution of acetonitrile, Flow rate: 0.5 ml/min, Column temperature: 25° C., PDA detection wavelength: 254 nm The results confirmed that the HPLC area percent of the compound represented by Formula (1-1), the HPLC area percent of the compound represented by Formula (1-2), and the HPLC area percent of the compound represented by Formula (2-1) were 95%, 2.5%, and 2.5%, respectively.

The resulting compounds were each subjected to mass spectrometry, proton nuclear magnetic resonance ($^1$H-

NMR) spectroscopy, and carbon-13 nuclear magnetic resonance ($^{13}$C-NMR) spectroscopy, and were confirmed to have the following structures.

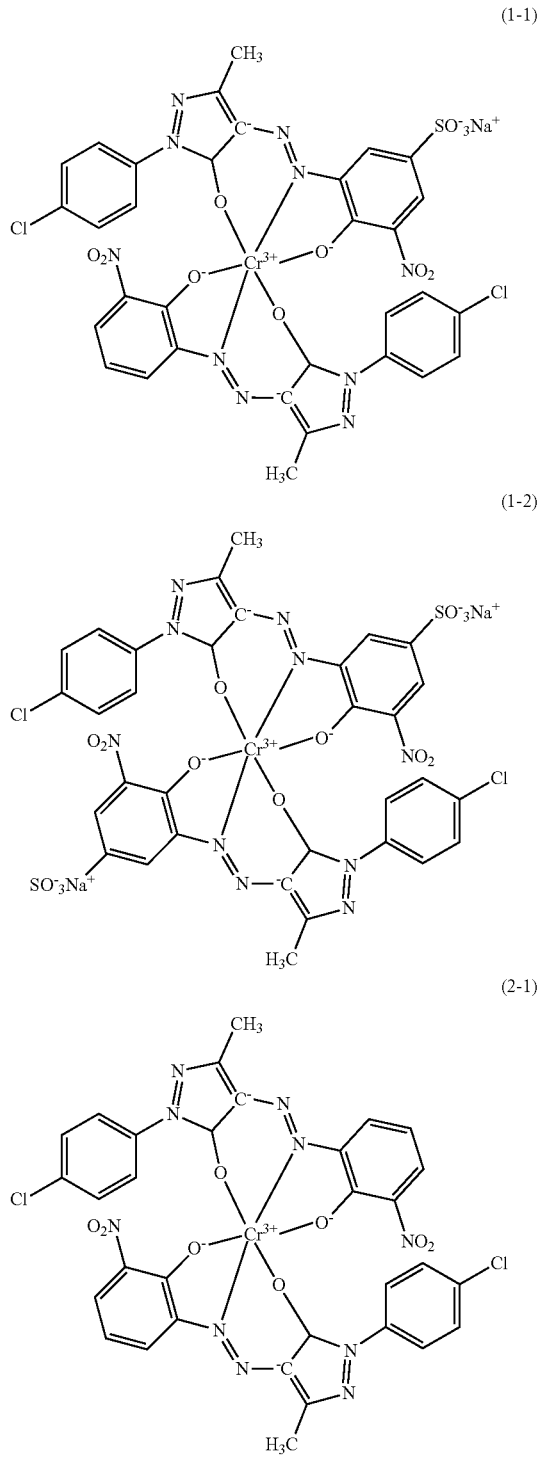

Production Example 2 (Dye Used in Example 2)

While a 10% solution of fuming sulfuric acid was cooled with ice to maintain a temperature of 10° C. or less, 20 parts of the azo compound obtained in Step 2 of Example 1 was gradually added to the solution for a reaction at 10° C. for 4 hours. The reaction liquid was poured into 400 parts of iced water, 30 parts of sodium chloride was added thereto, and the resulting mixture was agitated for 1 hour. A precipitated solid was then filtered and washed with 25 parts of a 10% aqueous solution of sodium chloride to yield a wet cake. Next, the resulting wet cake was added to 400 parts of water and the mixture was agitated for 30 minutes, after which insolubles were filtered out. Subsequently, 40 parts of sodium chloride was added to the resulting mother liquor and the mixture was agitated for 1 hour. A precipitated solid was then filtered and dried to yield a red wet cake as a dye. The resulting dye was analyzed by high performance liquid chromatography (HPLC).

Each component in the dye was separated according to the following conditions by HPLC.
HPLC Conditions
ODS column: BEH C$_{18}$, 1.7 µm, 100 mm (manufactured by Waters Corporation),
Eluent: gradient of 1% aqueous solution of acetonitrile to 95% aqueous solution of acetonitrile,
Flow rate: 0.5 ml/min,
Column temperature: 25° C.,
PDA detection wavelength: 254 nm The results confirmed that the HPLC area percent of the compound represented by Formula (1-1), the HPLC area percent of the compound represented by Formula (1-2), and the HPLC area percent of the compound represented by Formula (2-1) were 45%, 0%, and 55%, respectively.

Production Example 3 (Dye Used in Example 3)

While a 30% solution of fuming sulfuric acid was cooled with ice to maintain a temperature of 10° C. or less, 20 parts of the azo compound obtained in Step 2 of Example 1 was gradually added to the solution for a reaction at 25° C. for 2 hours. The reaction liquid was poured into 400 parts of iced water, 30 parts of sodium chloride was added thereto, and the resulting mixture was agitated for 1 hour. A precipitated solid was then filtered and washed with 25 parts of a 10% aqueous solution of sodium chloride to yield a wet cake. Next, the resulting wet cake was added to 400 parts of water and the mixture was agitated for 30 minutes, after which insolubles were filtered out. Subsequently, 40 parts of sodium chloride was added to the resulting mother liquor and the mixture was agitated for 1 hour. A precipitated solid was then filtered and dried to yield a red wet cake as a dye. The resulting dye was analyzed by high performance liquid chromatography (HPLC).

Each component in the dye was separated according to the following conditions by HPLC.
HPLC Conditions
ODS column: BEH C$_{18}$, 1.7 µm, 100 mm (manufactured by Waters Corporation),
Eluent: gradient of 1% aqueous solution of acetonitrile to 95% aqueous solution of acetonitrile,
Flow rate: 0.5 ml/min,
Column temperature: 25° C.,
PDA detection wavelength: 254 nm The results confirmed that the HPLC area percent of the compound represented by Formula (1-1), the HPLC area percent of the compound represented by Formula (1-2), and the HPLC area percent of the compound represented by Formula (2-1) were 60%, 37.5%, and 2.5%, respectively.

Production Example 4 (Dye Used in Example 4)

The dye obtained in Step 3 of Example 1 and the dye obtained in Example 2 were mixed with each other at a ratio of 1:1 to prepare a dye used in Example 4.

Production Example 5 (Dyes Used in Examples 5 and 6)

The dye obtained in Example 2 and the dye obtained in Example 3 were mixed with each other at a ratio of 1:1 to prepare dyes used in Examples 5 and 6.

Production Examples 6 to 8 (Dyes Used in Examples 7 to 9)

Only the compound represented by Formula (1-1) was filtered from the dye obtained in Step 3 of Example 1 by using a preparative separation function of the HPLC system and was purified to prepare dyes used in Examples 7 to 9.

Production Example 10 (Dye Used in Reference Example 1)

The azo compound obtained in Step 2 of Production Example 1 was selected as a dye used in Reference Example 1.

Materials for Ink Compositions

The main materials for the ink compositions used in the production of the following recorded articles are as follows.
Dyes
   Dyes in Production Examples 1 to 10
   C.I. Acid Red 447 (product name, manufactured by Dura Color U.K. Ltd.)
Compound Having a Lactam Structure
   2-pyrrolidone
Polyol Derivatives
   Glycerol
   Triethylene glycol
   Triethylene glycol monobutyl ether
Surfactant
   OLFINE PD-002W (product name, manufactured by Nissin Chemical Industry Co., Ltd.)
Other Additives
   Tripropanol amine
   PROXEL XL2 (product name, manufactured by Arch Chemicals, Inc.)
   Disodium ethylenediaminetetraacetate
Water
   Ion-exchanged water
Preparation of Ink Compositions The materials were mixed according to the composition given in Table 1 below and sufficiently agitated to yield ink compositions. It is to be noted that the unit of the numerical values other than the content ratio is mass % and the numerical values denote the solid content concentration, with the total being 100.0 mass %.

TABLE 1

|  |  | Example 1 | Example 2 | Example 3 | Example 4 | Example 5 | Example 6 |
|---|---|---|---|---|---|---|---|
| Dyes | Compound represented by Formula (1-1) | 7.6 | 3.6 | 4.8 | 5.6 | 4.2 | 4.2 |
|  | Compound represented by Formula (1-2) | 0.2 | 0.0 | 3.0 | 0.1 | 1.5 | 1.5 |
|  | Compound represented by Formula (2-1) | 0.2 | 4.4 | 0.2 | 2.3 | 2.3 | 2.3 |
|  | C.I. Acid Red 447 | — | — | — | — | — | — |
|  | Subtotal | 8.0 | 8.0 | 8.0 | 8.0 | 8.0 | 8.0 |
| Compound having lactam structure | 2-pyrrolidone | 10 | 10 | 10 | 10 | 10 | 0 |
| Polyol derivatives | Triethylene glycol monobutyl ether | 5.0 | 5.0 | 5.0 | 5.0 | 5.0 | 5.0 |
|  | Glycerol | 8.0 | 8.0 | 8.0 | 8.0 | 8.0 | 18 |
|  | Triethylene glycol | 8.0 | 8.0 | 8.0 | 8.0 | 8.0 | 8.0 |
| Surfactant | OLFINE PD-002W | 0.5 | 0.5 | 0.5 | 0.5 | 0.5 | 0.5 |
| Additives | Tripropanol amine | 0.2 | 0.2 | 0.2 | 0.2 | 0.2 | 0.2 |
|  | PROXEL XL2 | 0.3 | 0.3 | 0.3 | 0.3 | 0.3 | 0.3 |
|  | Disodium ethylenediaminetetraacetate | 0.01 | 0.01 | 0.01 | 0.01 | 0.01 | 0.01 |
| Water | Ion-exchanged water | Balance | Balance | Balance | Balance | Balance | Balance |
|  | Total | 100 | 100 | 100 | 100 | 100 | 100 |
| Evaluation results | Light fastness | A | A | A | A | A | A |
|  | Water fastness | A | A | C | A | B | B |
|  | Recovery from clogging | A | C | A | B | B | C |
|  | Storage stability | A | A | A | A | A | A |

|  |  | Example 7 | Example 8 | Example 9 | Comparative Example 1 | Reference Example 1 |
|---|---|---|---|---|---|---|
| Dyes | Compound represented by Formula (1-1) | 8.0 | 0.1 | 15 | — | 0.0 |
|  | Compound represented by Formula (1-2) | 0.0 | 0.0 | 0.0 | — | 0.0 |
|  | Compound represented by Formula (2-1) | 0.0 | 0.0 | 0.0 | — | 8.0 |
|  | C.I. Acid Red 447 | — | — | — | 8.0 | — |
|  | Subtotal | 8.0 | 0.1 | 15 | 8.0 | 8.0 |

TABLE 1-continued

| | | | | | | |
|---|---|---|---|---|---|---|
| Compound having lactam structure | 2-pyrrolidone | 10 | 10 | 10 | 10 | 10 |
| Polyol derivatives | Triethylene glycol monobutyl ether | 5.0 | 5.0 | 5.0 | 5.0 | 5.0 |
| | Glycerol | 8.0 | 8.0 | 8.0 | 8.0 | 8.0 |
| | Triethylene glycol | 8.0 | 8.0 | 8.0 | 8.0 | 8.0 |
| Surfactant | OLFINE PD-002W | 0.5 | 0.5 | 0.5 | 0.5 | 0.5 |
| Additives | Tripropanol amine | 0.2 | 0.2 | 0.2 | 0.2 | 0.2 |
| | PROXEL XL2 | 0.3 | 0.3 | 0.3 | 0.3 | 0.3 |
| | Disodium ethylenediaminetetraacetate | 0.01 | 0.01 | 0.01 | 0.01 | 0.01 |
| Water | Ion-exchanged water | Balance | Balance | Balance | Balance | Balance |
| | Total | 100 | 100 | 100 | 100 | 100 |
| Evaluation results | Light fastness | A | C | A | D | A |
| | Water fastness | A | A | A | D | A |
| | Recovery from clogging | A | A | C | D | D |
| | Storage stability | A | A | A | D | D |

Preparation of Pretreatment Liquid

After sufficiently mixing 5 parts by mass of a polyoxyethylene diisopropyl ether (30 mol oxyethylene), 5 parts by mass of etherified carboxymethyl cellulose, 100 parts by mass of urea, and 10 parts by mass of sodium m-benzenesulfonate, the mixture was agitated at 60° C. for 30 minutes while adding 1000 parts by mass of ion-exchanged water thereto in small increments. Next, 30 parts by mass of sodium carbonate was added to the solution being agitated and the mixture was agitated for 10 minutes. The solution was filtered by using a membrane filter having a pore diameter of 10 μm to yield a pretreatment liquid.

A fabric was coated with the pretreatment liquid obtained as described above and was squeezed and dried by using a padding mangle at a pick up rate of 20%.

Production of Textile Prints

Each of the ink compositions prepared above was filled into cartridges of a PX-G930 (product name, manufactured by Seiko Epson Corporation) ink jet printer. Each of the ink compositions was caused to adhere to a fabric (silk 100%; basis weight: 90 g/m$^2$) subjected to pretreatment by using the pretreatment liquid prepared above and an image was recorded. Thus, an image was formed on the fabric serving as a recording medium in a solid image pattern at a print resolution of 1440×720 dpi with a print duty of 100%. In other words, textile prints with an ink textile printed thereon were manufactured. After steaming was performed at 100° C. for 20 minutes on the fabric on which the image was printed, the fabric was washed with an aqueous solution containing 0.2 parts by mass of Laccol STA (a surfactant manufactured by Meisei Chemical Works Ltd.) at 55° C. for 10 minutes and dried to obtain textile prints. As used herein, the term "solid image pattern" refers to a pattern in which dots are recorded in all pixels, which are minimum recording unit regions defined by the recording resolution.

Light Fastness

The textile prints in all of the examples were exposed to light by using a Xenon XL-75s (product name, manufactured by Suga Test Instruments Co., Ltd.) light fastness tester at 23° C., at a relative humidity of 50% RH, and at an illuminance of 75000 lux for 10 days. Next, the hue of each sample before and after the exposure was measured. Specifically, the L* value, the a* value, and the b* value of all of the textile prints were measured by using a Spectrolino (product name, manufactured by X-Rite Inc.) spectral densitometer with a D65 light source, a status of DIN_NB, a viewing angle of 2 degrees, and an UV filter. Next, the difference (ΔE*) in hue between the prints before and after printing (start and Day 10) was calculated based on the following formulas, and the light fastness was evaluated by using the following evaluation criteria.

$$\Delta E^* = \{(\Delta L^*)^2 + (\Delta a^*)^2 + (\Delta b^*)^2\}^{1/2} \quad \text{(Numerical Formula 2)}$$

$$\Delta L^* = L^*_1 - L^*_2 \quad \text{(Numerical Formula 3)}$$

$$\Delta a^* = a^*_1 - a^*_2 \quad \text{(Numerical Formula 4)}$$

$$\Delta b^* = b^*_1 - b^*_2 \quad \text{(Numerical Formula 5)}$$

It is to be noted that $L^*_1$, $a^*_1$, and $b^*_1$ denote the measured values of the textile prints at the start and $L^*_2$, $a^*_2$, and $b^*_2$ denote the measured values of the textile prints after exposure for 10 days.

Evaluation Criteria

A: ΔE* is less than 10
B: ΔE* is 10 or more and less than 12.5
C: ΔE* is 12.5 or more and less than 15
D: ΔE* is 15 or more Water Fastness A water fastness test was conducted on all the obtained textile prints according to the method described in JIS L 0846: 2004. It is to be noted that the standard adjacent fabrics used for the test, which were the first standard adjacent fabric and the second standard adjacent fabric, were the same cotton fabrics (No. 3-3) described in JIS L 0803 and were purchased from the Japanese Standards Association. Classes were evaluated by using the visual method according to JIS L 0801 Item 10-a, and the water fastness was evaluated by using the following evaluation criteria.

Evaluation Criteria

A: Class 5
B: Class 4 and between Classes 4 and 5
C: Between Classes 3 and 4
D: Class 3

Recovery from Clogging

Each of the ink compositions prepared above was filled into the PX-G930 (product name, manufactured by Seiko Epson Corporation) ink jet printer and was ejected from all the nozzles. The printer was left to stand with the print heads removed from the caps at 40° C. and 20% RH for 7 days. Next, cleaning and nozzle-check printing were alternately repeated and the number of times of cleaning required until recovery to normal ejection that is free from missing dots or deflection of ink droplets was counted. The recovery from clogging was evaluated based on the number of cleanings by using the following evaluation criteria. The results are given in Table 1.

Evaluation Criteria

A: 1 time or less

B: 2 or 3 times

C: 4 or 5 times

D: 6 times or more

Storage Stability

Each of the ink compositions prepared as described above was filled into sample bottles and was left to stand at 60° C. for 7 days, and the pH of each of the ink compositions before being left to stand (immediately after preparation) and after being left to stand was measured to evaluate the storage stability by using the following evaluation criteria. The results are given in Table 1.

Evaluation Criteria

A: The amount of change in pH is less than 1, and the measured pH after the ink composition was left to stand is 6 or more B: The amount of change in pH is 1 or more and less than 2, and the measured pH after the ink composition was left to stand is 6 or more C: The amount of change in pH is 2 or more, and the measured pH after the ink composition was left to stand is 6 or more D: The measured pH after the ink composition was left to stand is less than 6

Evaluation Results

The results revealed that, in the examples, all the ink compositions prepared so as to contain the dye according to the present embodiment were evaluated as C or higher and were good in light fastness and water fastness and in recovery from clogging and storage stability. Furthermore, the comparison of Examples 1 and 2 revealed that when the ink composition contains the first dye and the second dye, recovery from clogging is better. The comparison of Examples 1 and 3 and the comparison of Examples 1 and 5 revealed that when the ink composition contains the second dye at a ratio having a predetermined value or less with respect to the first dye, water fastness is better. The comparison of Examples 1 and 4 and the comparison of Examples 1 and 5 revealed that when the ink composition contains the third dye at a ratio having a predetermined value or less with respect to the sulfonic acid group-containing dye, recovery from clogging is better. The comparison of Examples 5 and 6 revealed that when the ink composition contains a compound having a lactam structure, recovery from clogging is better. The comparison of Example 7 and Reference Example 1 revealed that when the ink composition contains the first dye, recovery from clogging and storage stability are better. The comparison of Examples 7 and 8 and the comparison of Examples 7 and 9 revealed that when the content of the dye according to the present embodiment is within a predetermined range, light fastness and recovery from clogging are better.

What is claimed is:

1. An ink jet textile printing ink composition comprising a sulfonic acid group-containing dye having a ligand coordinated to a metal atom, the ligand being represented by Formula (1) below:

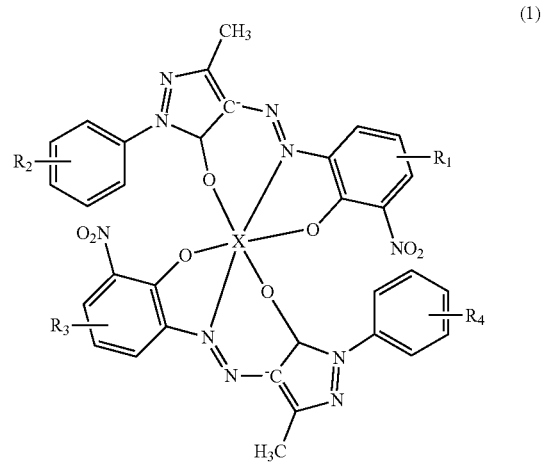

wherein at least one of $R_1$ and $R_3$ represents $SO_3^-$ or $SO_3Y$, where Y represents a hydrogen atom, an alkali metal atom, or an alkaline earth metal atom; when not representing $SO_3^-$ or $SO_3Y$, $R_2$ and $R_3$ represent a halogen atom or a hydrogen atom; $R_2$ and $R_4$ each independently represent a hydrogen atom, a halogen atom, a sulfo group, a nitro group, an aryl group, a sulfonamide group, a carboxy group, an alkyl group of 1 to 4 carbon atoms, $SO_2NHR_5$, or $COOR_5$, where $R_5$ represents a hydrogen atom or an alkyl group; and X represents a metal atom.

2. The ink jet textile printing ink composition according to claim 1, wherein the metal atom is a chromium atom.

3. The ink jet textile printing ink composition according to claim 1, further comprising:

a first dye having a ligand represented by Formula (1) where one of $R_1$ and $R_3$ represents $SO_3^-$ or $SO_3Y$, and the other represents a halogen atom or a hydrogen atom, the ligand being coordinated to a metal atom and a second dye having a ligand represented by Formula (1) where both $R_1$ and $R_3$ represent $SO_3^-$ or $SO_3Y$, the ligand being coordinated to a metal atom.

4. The ink jet textile printing ink composition according to claim 3, wherein a mass ratio of a content of the second dye to a content of the first dye is 1/100 to 1/1.

5. The ink jet textile printing ink composition according to claim 3, wherein a content of the second dye is 0.1% by mass or more and 50% by mass or less with respect to a total amount of the ink jet textile printing ink composition.

6. The ink jet textile printing ink composition according to claim 1, further comprising:

a third dye having a ligand coordinated to a metal atom, the ligand being represented by Formula (2) below:

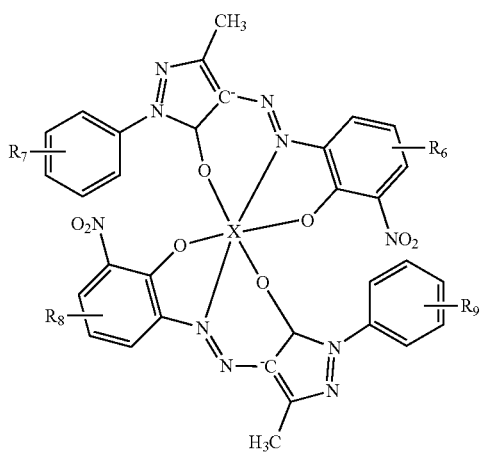

(2)

wherein $R_6$ and $R_8$ each independently represent a halogen atom or a hydrogen atom; $R_7$ and $R_9$ each independently represent a hydrogen atom, a halogen atom, a sulfo group, a nitro group, an aryl group, a sulfonamide group, a carboxy group, an alkyl group of 1 to 4 carbon atoms, $SO_2NHR_5$, or $COOR_5$, where $R_5$ represents a hydrogen atom or an alkyl group; and X represents a metal atom.

7. The ink jet textile printing ink composition according to claim 6, wherein a mass ratio of a content of the third dye to a content of the sulfonic acid group-containing dye is 1/99 to 1/1.

8. The ink jet textile printing ink composition according to claim 6, wherein a content of the third dye is 0.1% by mass or more and 20% by mass or less with respect to a total amount of the ink jet textile printing ink composition.

9. The ink jet textile printing ink composition according to claim 1, wherein a content of the sulfonic acid group-containing dye is 0.01% by mass or more and 50% by mass or less with respect to a total amount of the ink jet textile printing ink composition.

10. The ink jet textile printing ink composition according to claim 1, further comprising:
a compound having a lactam structure.

11. The ink jet textile printing ink composition according to claim 10, wherein the compound having a lactam structure is 2-pyrrolidone, 2-azetidinone, 2-piperidone, ε-caprolactam, 4-ethyl-2-azetidinone, N-methyl-2-pyrrolidone, or 3-amino-2-piperidone.

12. The ink jet textile printing ink composition according to claim 10, wherein a content of the compound having a lactam structure is 1.0% by mass or more and 20% by mass or less with respect to a total amount of the ink jet textile printing ink composition.

13. A recording method comprising:
ejecting the ink jet textile printing ink composition according to claim 1 by using an ink jet system and causing the ink jet textile printing ink composition to adhere to a recording medium, wherein the recording medium is a fabric.

* * * * *